Patented Nov. 3, 1953

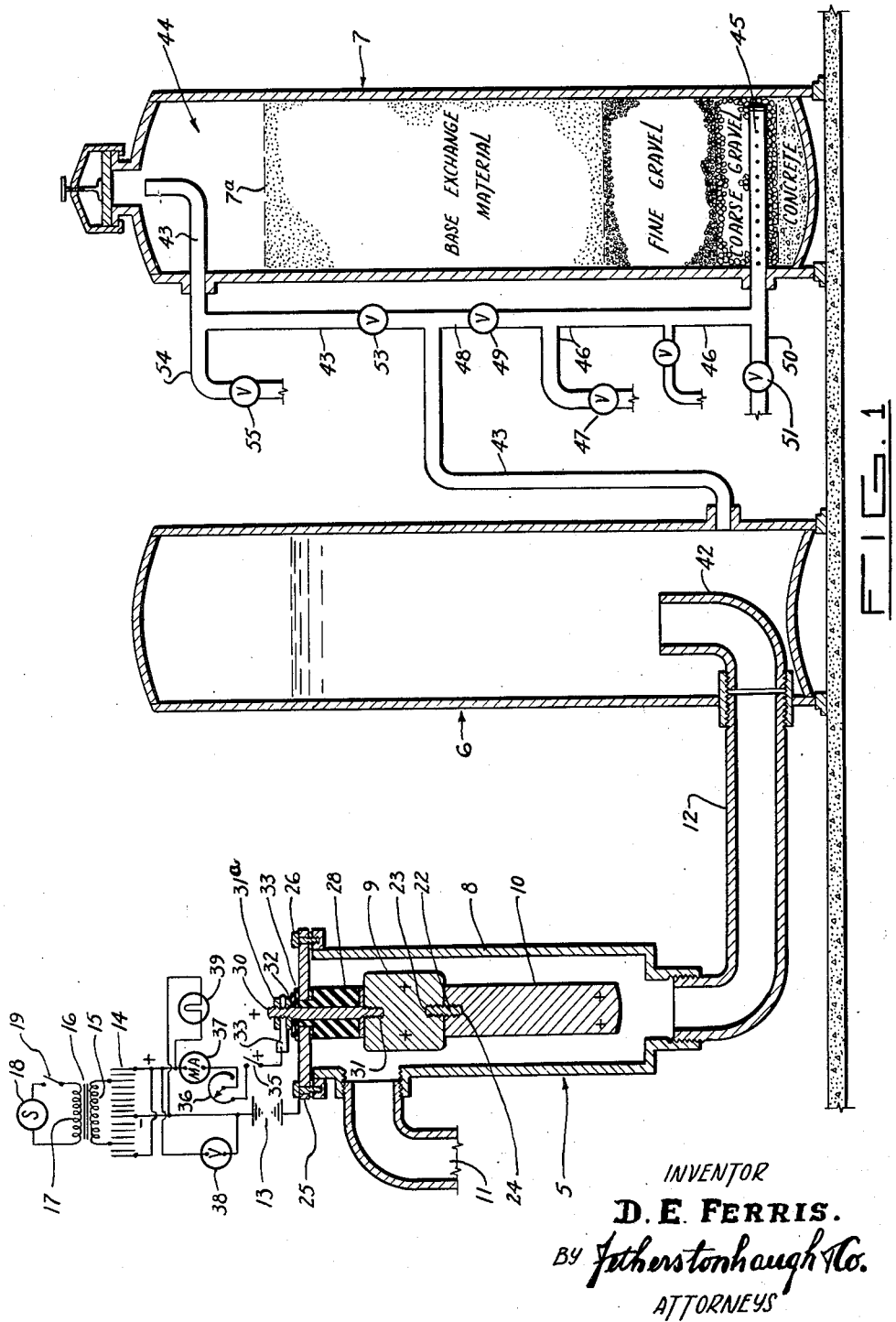

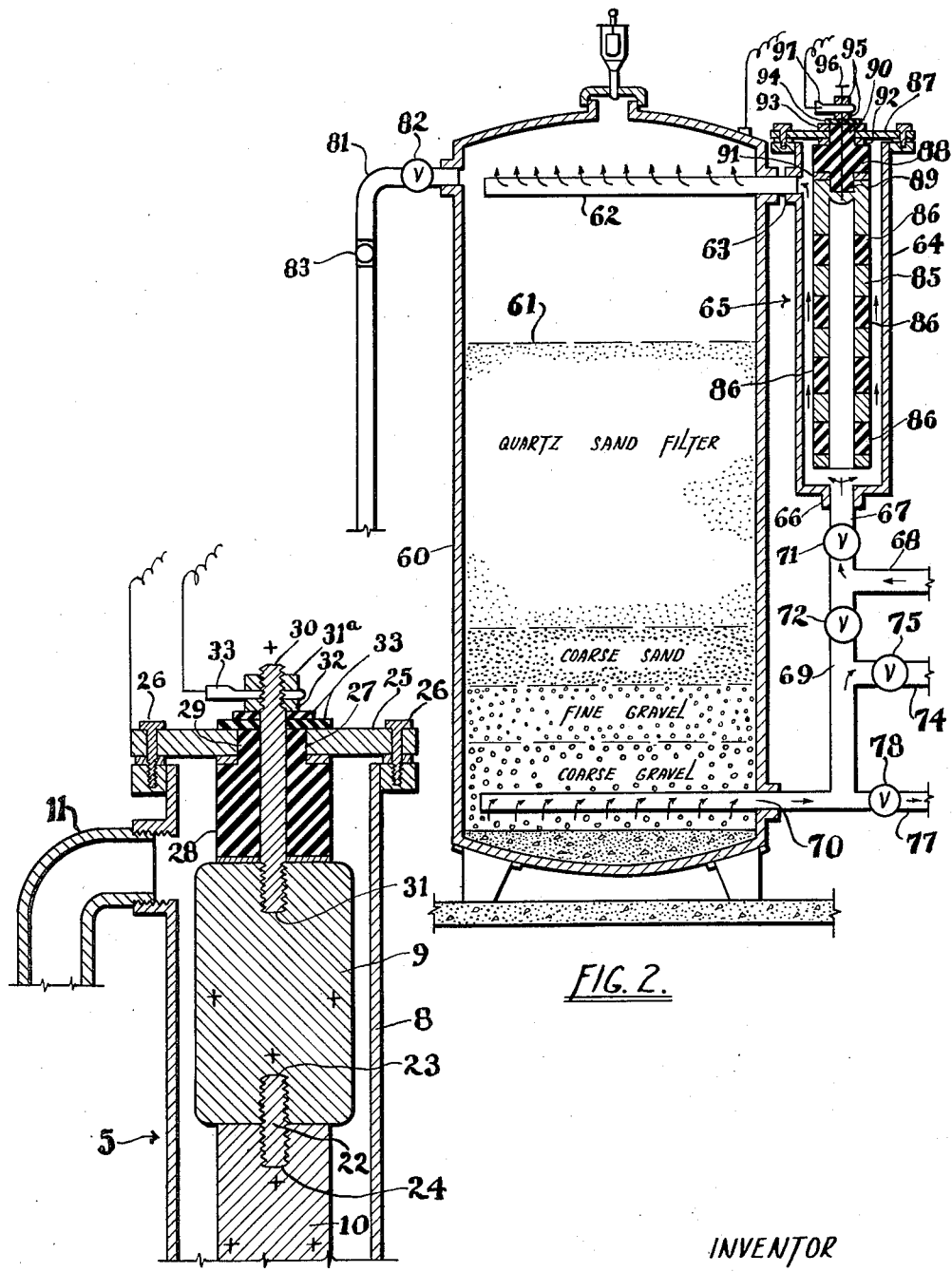

2,658,033

UNITED STATES PATENT OFFICE 2,658,033

ELECTROLYTIC METHOD AND APPARATUS FOR STERILIZING WATER

Donald Edward Ferris, Saint John, New Brunswick, Canada

Application January 7, 1950, Serial No. 137,400

2 Claims. (Cl. 204—152)

This invention relates to improvements in the sterilization of water.

More particularly, the invention provides an exceptionally rapid and efficient water sterilizing method and apparatus whereby water, in contact with metal surfaces of the apparatus, is subjected to the sterilizing action of electrolytically produced silver ions in the presence of a coating of electrolytically produced aluminum hydroxide covering said surfaces and is then substantially completely purged of the silver after the latter has performed its sterilizing function and before the sterilized water is delivered to the point of use. By this procedure the optimum conditions are provided for rapid and efficient sterilization of water by the sterilizing action of silver and for the complete removal of the silver from the water before the latter is delivered to the point of use.

A salient feature of the invention is the charging of the water with electrolytically produced silver ions since it is in this condition that silver exhibits its maximum ability for rapidly attracting and destroying bacteria. However, the charging of the water with electrolytically produced silver ions poses the problem of maintaining the silver in the ionized condition for a sufficient period of time to ensure complete sterilization of the water. According to the present invention this problem is effectively solved by covering the metal surfaces in contact with the water with a coating of electrolytically produced aluminum hydroxide which has the effect of keeping the silver ions in solution in the water by preventing them from being plated out on the metal surfaces as colloidal or metallic silver.

Another important feature of the invention resides in the procedures employed for efficiently removing the silver ions from the water while the latter is in transit to the point of use.

In one application of the invention the silver is removed by base exchange procedure. In this case the raw water is first passed through a sterilizing unit comprising a metal casing connected to the negative terminal of a source of direct current electrical energy and containing both silver and aluminum electrodes connected to the positive terminal of said source of electrical amperage. The treated water is passed from the sterilizing unit to a base exchange water softener either directly or by way of a storage tank connected between the water softener and the sterilizing unit. The base exchange material used in the water softener may be of any type which is capable of removing the silver ions from the water by ion or base exchange mechanism. The base exchange material which I prefer to use is a high capacity black resinous zeolite which is now being used in water softening operations for the purpose of softening and removing iron from water in one operation. However, white zeolite or any other suitable base exchange material may be substituted for the black resinous zeolite. During its passage through the sterilizing unit the raw water is simultaneously charged with silver ions and with aluminum hydroxide. The aluminum hydroxide builds up on the metal surfaces in contact with the water to form a silver repelling coating which prevents the silver being plated or deposited on said metal surfaces as metallic or colloidal silver. The silver is thus maintained in the water in the form of silver ions in which it is most effective to destroy bacteria until the water is passed through the bed of base exchange material in the water softener. The silver which is removed from the water by the base exchange material has the effect of sterilizing the said base exchange material and destroying harmful bacteria trapped therein.

In another application of the invention the sterilized water is passed from the sterilizing unit to and through a sand filter, the water being charged with sufficient aluminum hydroxide to cause the latter to build up, on top of the filter bed, a coating of aluminum hydroxide which is effective to prevent passage of the ionized silver therethrough. In this connection it may be explained that the extent to which the water is charged with aluminum hydroxide and with silver ions is controllable and is dependent, in part, on the size of the silver and aluminum electrodes employed and, in part, on the amperage of the current supplied to said electrodes.

Another important advantage of the invention is that it may be employed as a method of sterilizing base exchange materials used in base exchange water softening and iron removing operations so that the sterilized material may be kept in storage for considerable periods of time and shipped to the point of use in the bulk or dry state.

Proceeding now to a more detailed description of the various aspects of this invention, reference will be had to the accompanying drawings, in which—

Fig. 1 is a diagrammatic view of a water softening, sterilizing and iron removing installation embodying said invention.

Fig. 2 is a diagrammatic view showing the invention embodied in a water purifying installation of the sand filter type.

Fig. 3 is an enlarged sectional view of the sterilizing unit forming part of the installation shown in Fig. 1.

The installation shown in Figs. 1 and 3 includes a sterilizing unit 5, a conventional pneumatic pressure storage tank 6, and a base exchange water softener 7.

The sterilizing unit 5 comprises a metal tank 8 containing an aluminum electrode 9 and a silver electrode 10.

Tank 8 is provided with a raw water inlet 11 and a treated-water outlet 12 and is grounded, as indicated at 13, to the negative terminal of a direct current source of electrical energy which, in the present instance, is represented by an alternating current rectifier 14 connected across the secondary 15 of a transformer 16 having its primary 17 connected across an alternating current source 18 in series with a suitably fused master switch 19.

The electrodes 9 and 10 are electrically and mechanically connected together in end to end relation by a screw threaded connecting member 22 having its upper portion screwed into a threaded opening 23 in the lower end of electrode 9 and having its lower portion screwed into a threaded opening 24 in the upper end of electrode 10. The electrodes 9 and 10 are suspended from a removable cover 25 of tank 8 so that the electrodes are insulated from the cover and are also disposed in spaced relation to the bottom and circumferential walls of the tank. In this connection it will be noted that cover 25 (Fig. 3) is fastened to tank 8 by bolts 26 and is provided with a relatively large central opening 27. An insulator 28 is interposed between the tank cover 25 and the upper end of electrode 9 and is formed with an upper reduced neck extension 29 which is fitted in the cover opening 27. Insulator 28 is provided with a central opening for the passage of a screw threaded binding post 30 which projects above and below the insulator. The lower end of post 30 is screwed into a screw threaded opening 31 in the upper end of electrode 9. The upper end of post 30 carries upper and lower clamping nuts 31a and 32 between which a terminal member 33 is clamped, the lower nut 32 being screwed tightly against suitable insulating washers 33 which surround the upper portion of post 30 and are supported on the tank cover 25. The terminal member 33 is connected to the positive terminal of rectifier 14 in series with an electrode control switch 35, a rheostat 36 and a millimeter 37. A voltmeter 38 and a pilot light 39 are also shown connected across the output terminals of rectifier 14.

During its passage through tank 8 the raw water is charged with aluminum hydroxide and silver ions supplied respectively by the aluminum electrode 9 and the silver electrode 10. The extent to which the water is charged with silver and with aluminum hydroxide during its passage through tank 8 is dependent upon the size of the electrodes 9 and 10 and the amperage of the current supplied thereto. The regulation of these controlling factors is determined in accordance with the results of tests to which the treated water is subjected after it has passed through a sterilizing unit 5, the storage tank 6 and the water softener 7. If these tests show that the water is not sufficiently sterile or contains silver the size of the electrode and/or the amperage of the current supplied to the electrodes is varied until the tested water shows the desired sterility and freedom from silver.

The aluminum hydroxide with which the water is charged during its passage through sterilizing tank 5 forms an aluminum coating on the inner metal surfaces of the tanks 8, 6 and 7 and on the inner surfaces of the various metal pipes or conduits connecting said tanks. The aluminum hydroxide coating is impermeable to the passage of silver ions and thus serves to maintain the silver in the water in the ionized condition in which the silver is most effective to destroy bacteria until the water reaches and passes through the zeolite or other base exchange material 7a contained in the water softener tank 7.

Storage tank 6 is provided with an upflow inlet 42 connected to outlet 12 of sterilizing unit 5. From tank 6 the water is conducted by pipe 43 to a clear space 44 reserved in the upper portion of water softener tank 7 above the level of the base exchange material 7a. The water thus supplied to water softener 7 flows downwardly through base exchange material 7a to an outlet manifold 45 connected to a treated-water discharge pipe 46 equipped with control valve 47. Pipe 46 is connected to pipe 43 by means of a by-pass pipe 48 equipped with control valve 49. Pipe 46 is also connected to a pipe 50 which serves as a drain and rinse pipe and is equipped with a valve 51. Pipe 43 is equipped with a valve 53 located between the discharge end of said pipe and the by-pass valve 49. A back wash pipe 54 provided with a valve 55 is connected to pipe 43 at a point between valve 53 and the discharge end of pipe 43.

Samples of the treated water flowing through the treated-water discharge pipe 46 are drawn off through a sample pipe 56 equipped with a valve 57. If the samples fail to meet the requirements as to sterility and freedom from silver, this condition is remedied by varying the size of the electrodes and/or the amperage of the current supplied to said electrodes.

In the operation of the apparatus disclosed in Fig. 1, the valves 53 and 47 are normally open and the valves 49, 51 and 55 are normally closed. In this position of the valves referred to water is delivered from the storage tank 6 to the top of water softener tank 7 and flows downwardly through the base exchange material 7a to discharge manifold 45 and thence to treated-water discharge pipe 46. At suitable intervals the bed of base exchange material in water softener tank 7 is regenerated and cleaned by conventional rinsing and back washing operations. During the back washing operation valves 53, 47 and 50 are closed and valves 49 and 55 are opened. In this position of the valves referred to back washing water from storage tank 6 is delivered through the lower portion of pipe 43, by-pass pipe 49 and pipe 46 to manifold 45 and rises through the base exchange material to the top of water softener tank 7 and leaves said tank through the upper portion of pipe 43 and back wash pipe 54. During rinsing of the base exchange material the valves 53 and 51 are open and valves 47, 49 and 54 are closed so that rinsing water is delivered to the upper portion of water softener tank 7 through pipe 46 and, after passing downwardly through the base exchange material 7a, is discharged from tank 7 through valve 51 which also serves as a drain valve for the water softener tank.

In Figure 2, the invention is shown incorporated in a water-conditioning installation of the sand-filter type. In these figures I have shown only those parts of the installation which are deemed necessary to an understanding of the principles and application of the invention. Such parts include a filter tank 60 containing a sand and gravel filter bed 61. Water is supplied to tank 60 through an inlet manifold 62 located in the upper portion of the tank above the filter bed. The inlet end of manifold 62 is connected to a water outlet 63 provided in the upper portion of an electrode casing 64 containing a composite electrode unit 65 composed partly of aluminum and partly of silver, as more particularly hereinafter described. Electrode casing 64 is also provided with a bottom raw water inlet 66 to which raw water is supplied through an upwardly extending branch 67 of a raw water supply pipe 68. A second downwardly extending branch 69 of raw water supply pipe 68 is connected to the inlet end of a second manifold 70 extending across the lower portion of tank 60 at the bottom of the filter bed. The flow of raw water from supply pipe 68 to electrode casing 64 through branch pipe 67 is controlled by a valve 71. The flow of raw water from supply pipe 68 to the lower manifold 70 by way of branch pipe 69 is controlled by a valve 72.

A treated-water discharge pipe 74 through which treated water is conducted from the lower portion of tank 60 to the point of use is connected to the branch pipe 69 at a point below valve 16. The treated-water discharge pipe 74 is provided with a flow control valve 75.

The lower manifold 70, as is customary in installations of this type, serves a dual purpose. During the conditioning of the water it serves as an outlet manifold through which the treated water is delivered from the lower portion of tank 60 to the treated-water discharge pipe 74. During back-washing of filter bed 61 the manifold 70 serves as a back-washing manifold through which back-washing water is supplied from the raw water supply pipe 68 by way of branch 69.

During the water conditioning operation valve 72 is closed and the valves 71 and 75 are open so that the raw water supplied through the raw water supply pipe 68 passes through branch pipe 67, electrode casing 64 and upper manifold 62 into the upper portion of casing 60 whence it passes downwardly through the filter bed 61 and is discharged from the lower portion of the tank 60 by way of the lower manifold 70, the lower portion of branch pipe 69 and the treated-water discharge pipe 74.

During back-washing of filter bed 61 the valves 71 and 75 are closed and the valve 72 is open so that raw water for back washing purposes is supplied from the raw water supply pipe 68 to the lower manifold 70 by way of branch pipe 69.

During back-washing operation the back washing water rising through the filter bed 61 is discharged from the upper portion of tank 60 by way of a discharge pipe 81 equipped with a control valve 82 and a sight glass 83.

A drain pipe 77 provided with a flow control valve 78 is connected to a coupling 79 joining the lower end of branch pipe 69 to the inlet end of the lower manifold 70.

As here shown, the composite electrode unit 65 comprises an aluminum electrode 85 in the form of a hollow cylinder which is closed at its upper end and open at its lower end. The cylindrical wall of this electrode is provided with a multiplicity of openings in which silver plugs or studs 86 are fitted to provide a plurality of silver electrodes. The aluminum electrode 85 is suspended from the removable cover 87 of electrode casing 64 by means including an insulator 88. This insulator is provided with a lower threaded extension 89 which is screwed onto a threaded socket provided in the upper end of electrode 85. Insulator 88 is also provided with an upper reduced extension 90 extending upwardly through a central opening provided in the cover 87 of the electrode casing. A gasket or washer 91 surrounds the lower extension 89 of insulator 88 and is clamped in place between the main body portion of the insulator and the upper end of electrode 85. A second gasket or washer 92 surrounds the lower portion of the upper extension 90 of insulator 88 and is clamped in place between the main body of the insulator and the lower surface of the electrode casing cover 87. A third washer or gasket 93 surrounds the upper portion of the upper extension 90 of insulator 88 and is clamped in place against the upper surface of the electrode casing cover 87 by a clamping plate or washer 94 held in place by the lowermost of a pair of nuts 95 screwed onto the upper portion of a terminal post 96. This terminal post extends downwardly through the central portion of insulator 88 and has its lower end secured to electrode 85. A terminal member 97 is fitted on terminal post 96 and is clamped in place between the clamping nuts 95. This terminal member 97 and the tank 60 are electrically connected to a source of direct current in exactly the same manner as the terminal 33 and tank 8 as shown in Fig. 1.

I claim:

1. In a sterilizing apparatus of the character described, a sterilizing unit comprising a metal casing, a cylindrical aluminum electrode arranged in said casing and insulated therefrom, silver studs fitted in openings provided in the cylindrical wall of said aluminum electrode, said aluminum electrode and said studs being in electrical contact with each other and means for supplying direct current electrical energy having its negative terminal connected to said casing and its positive terminal connected to said aluminum electrode.

2. A method of sterilizing water which comprises passing it through a metal sterilizing casing and there contacting the water with silver and aluminum anodes connected to the positive terminal of a source of direct current electrical energy having its negative terminal connected to said casing, and passing current to said terminals at a current density that dissolves enough silver to sterilize the water and enough aluminum to form a coating of aluminum hydroxide on the casing.

DONALD EDWARD FERRIS.

References Cited in the file of this patent

UNITED STATES PATENTS

| Number | Name | Date |
| --- | --- | --- |
| 741,322 | Frazier | Oct. 13, 1903 |
| 943,188 | Hartman | Dec. 14, 1909 |
| 1,139,970 | Hartman | May 18, 1915 |
| 1,161,750 | Strohmenger | Nov. 23, 1915 |

FOREIGN PATENTS

| Number | Country | Date |
| --- | --- | --- |
| 661,311 | Germany | June 15, 1938 |
| 695,322 | Germany | Aug. 22, 1940 |